C. GATES.
Lawn-Mower.
No. 227,162.                              Patented May 4, 1880.
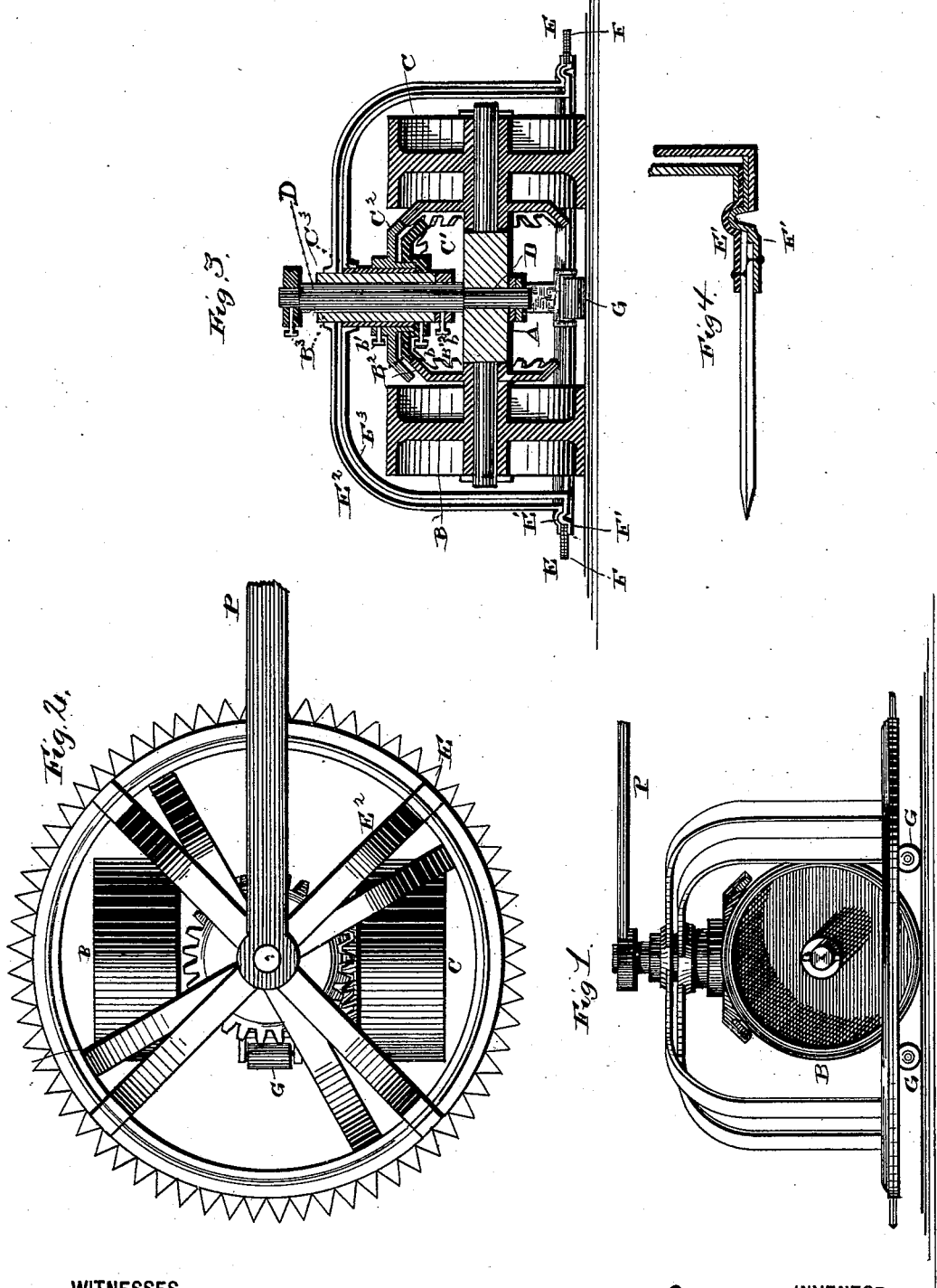
WITNESSES                                   INVENTOR

UNITED STATES PATENT OFFICE.

CHARLES GATES, OF CLEVELAND, OHIO.

LAWN-MOWER.

SPECIFICATION forming part of Letters Patent No. 227,162, dated May 4, 1880.

Application filed December 22, 1879.

*To all whom it may concern:*

Be it known that I, CHARLES GATES, of Cleveland, in the county of Cuyahoga and State of Ohio, have invented certain new and useful Improvements in Lawn-Mowers; and I do hereby declare the following to be a full, clear, and exact description of the invention, such as will enable others skilled in the art to which it pertains to make and use it, reference being had to the accompanying drawings, which form part of this specification.

My invention relates to lawn-mowers; and it consists in the construction hereinafter described and claimed.

In the drawings, Figure 1 is a side view of my device; Fig. 2, a plan view, and Fig. 3 a vertical sectional view. Fig. 4 is a detached vertical sectional view of the knives and cutting-bars, showing the manner of their attachment.

In the said drawings, A is an axle supporting the wheels B C, and about which they turn. To the wheel B is permanently attached the miter-gear B'. This meshes into a miter-gear, $B^2$, permanently attached to the hollow shaft $B^3$. To the wheel C is permanently attached a similar miter-gear, C'. This meshes into another miter-gear, $C^2$, permanently attached to the hollow shaft $C^3$. The hollow shaft $B^3$ revolves upon the permanent solid shaft D. The hollow shaft $C^3$ turns upon the hollow shaft $B^3$.

E and F are cutting-blades permanently attached to the cutting-bars E' and F'. These are supported by and connect with the hollow shafts $C^3$ and $B^3$ by means of the arms $E^2$ and $F^2$.

G G are rollers adapted to prevent the tilting forward or backward of the knives of my machine, and at the same time to act as rollers to roll the ground after the grass is cut.

In Fig. 4 I show the manner of connecting the cutter-bars of my device. In order to strengthen them I turn a bead in the lower cutter-bar, F', which forms a projection upon its upper side. To this I fit a corresponding recess in the upper cutter-bar, E'. This bead, with its recess, tends to keep the knives in close contact and at the same time rigidly in place, and also prevents lateral displacement.

The cutting-bars can be readily raised or lowered, so as to adapt themselves for cutting the grass shorter or longer, by means of the set-screws $b$ $b'$ $b^2$.

Having thus described the different parts of my device, its operation is as follows: Any suitable power may be applied to the arm P. This power may be applied either in pushing the device from behind or in drawing it from a point in front of the machine, as my device is equally adapted to cut in both directions. Power having been applied, the wheels B C will be set in motion, which in turn will carry with them the miter-gear B' and C'. This will communicate motion, through the miter-gear $B^2$ and $C^2$, hollow shafts $B^3$ and $C^3$, arms $E^2$ and $F^2$, to the cutting-bars E' and F'.

It will be observed that all the mechanism of my device is housed within the cutting-bar and its arms. This renders the mechanism less liable to become clogged by grass or other matter.

What I claim is—

1. In a mowing-machine, the combination, with an upper-ring cutter-bar having an upturned bead formed therein, of a lower-ring cutter-bar having a smaller bead formed therein and fitting against the under side of the bead in the upper bar, said beads serving to strengthen their respective cutter-bars, substantially as set forth.

2. In a mowing-machine, the combination, with a vertical central axis provided with a handle, two concentric sleeves fitted thereon, and ring cutter-bars, which surround their actuating mechanism, of gear-wheels rigidly secured to the inner sides of the ground-wheels and meshing with gears formed rigidly on the concentric sleeves, and arms which rigidly connect the sleeves respectively to the cutter-bars, substantially as set forth.

3. In a mowing-machine, the combination, with a vertical central axis provided with a handle, two concentric sleeves fitted thereon, and ring cutter-bars which surround their actuating mechanism, of gear-wheels rigidly formed on the inner side of the ground-wheel hubs and meshing with gears rigidly secured to the sleeves, and arms which connect the sleeves with the cutter-bars, said arms extending upward from the cutter-bars for a certain distance, and then extending horizontally to the sleeves, substantially as set forth.

4. In a mowing-machine, the combination, with upper and lower cutting-bars, which surround the operative mechanism and are formed as rings, of two rollers located respectively in front and rear of the central point of the machine, said rollers being within the inner circumference of the cutting-bars, substantially as set forth.

5. In a mowing-machine, the combination, with upper and lower circular cutting-bars and curved arms, which respectively connect them to concentric vertical sleeves, of two ground-wheels, which respectively gear with said sleeves, an upright shaft on which the inner sleeve is fitted, and means for vertically adjusting said sleeve on the shaft, substantially as set forth.

In testimony whereof I have signed my name to this specification in the presence of two subscribing witnesses.

CHARLES GATES.

Witnesses:
JNO. CROWELL, Jr.,
WILLARD FRACKER.